United States Patent
Zhao et al.

(10) Patent No.: US 12,185,092 B2
(45) Date of Patent: *Dec. 31, 2024

(54) ROOT NETWORK DEVICE CAUSING EXECUTION OF NETWORK SERVICE OPERATIONS ON BEHALF OF CONSTRAINED WIRELESS NETWORK DEVICE IN A LOW POWER AND LOSSY NETWORK

(71) Applicant: Cisco Technology, Inc., San Jose, CA (US)

(72) Inventors: Li Zhao, Shanghai (CN); Pascal Thubert, Roquefort les Pins (FR); Huimin She, Shanghai (CN); Haibo Dong, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/563,646

(22) Filed: Dec. 28, 2021

(65) Prior Publication Data

US 2022/0124073 A1 Apr. 21, 2022

Related U.S. Application Data

(63) Continuation of application No. 16/432,661, filed on Jun. 5, 2019, now Pat. No. 11,245,678.

(51) Int. Cl.
*H04L 9/40* (2022.01)
*H04W 12/033* (2021.01)
(Continued)

(52) U.S. Cl.
CPC .......... *H04W 40/02* (2013.01); *H04L 63/0209* (2013.01); *H04W 12/033* (2021.01); *H04W 28/0284* (2013.01); *H04L 63/0471* (2013.01)

(58) Field of Classification Search
CPC .......... H04L 63/0471; H04L 63/0209; H04W 12/033; H04W 28/0284; H04W 28/0289; H04W 40/02
See application file for complete search history.

(56) References Cited

U.S. PATENT DOCUMENTS 8,499,331 B1 * 7/2013 Yehuda ............... H04L 41/5009
709/224
9,239,784 B1 * 1/2016 Haghighi ............ G06F 12/0246
(Continued)

FOREIGN PATENT DOCUMENTS

EP 3270569 A1 1/2018

OTHER PUBLICATIONS

Cisco, "Cisco Connected Grid WPAN Module for CGE 1000 Series Installation and C-Mesh Configuration Guide", [online], Jun. 2017, [retrieved on May 10, 2019]. Retrieved from the Internet: URL: <https://www.cisco.com/c/en/us/td/docs/routers/connectedgrid/modules/wpan/release_5-0/Cisco_Connected_Grid_WPAN_Module_for_CGR_1000_Series_Installation_and_CG-Mesh_Configuration_Guide.pdf>, pp. 1-52.

(Continued)

*Primary Examiner* — Ghodrat Jamshidi
(74) *Attorney, Agent, or Firm* — BEHMKE INNOVATION GROUP LLC; James M. Behmke; Keith O. Mitchell (57) ABSTRACT

In one embodiment, a method comprises: registering, by a root network device in a low power and lossy network, a constrained network device that is reachable within the low power and lossy network; obtaining, by the root network device, executable code associated with execution of a network service operation by the constrained network device; receiving a data packet from a source device and destined for the constrained network device; and causing execution on the data packet, by the root network device, of (Continued)

the network service operation on behalf of the constrained network device in response to reception of the data packet.

18 Claims, 6 Drawing Sheets

(51) Int. Cl.
*H04W 28/02* (2009.01)
*H04W 40/02* (2009.01)

(56) References Cited

U.S. PATENT DOCUMENTS

| | | | |
|---|---|---|---|
| 9,432,336 B2* | 8/2016 | Ostrowski | H04L 63/0272 |
| 9,547,540 B1* | 1/2017 | Abel | G06F 9/54 |
| 9,591,451 B1* | 3/2017 | Knight | H04M 1/72412 |
| 9,948,597 B1* | 4/2018 | Bertz | H04L 61/2578 |
| 10,069,689 B1* | 9/2018 | Derby | H04L 41/12 |
| 10,964,023 B1* | 3/2021 | Vij | G06T 7/174 |
| 11,513,854 B1* | 11/2022 | Saxena | G06F 9/5088 |
| 2003/0093691 A1 | 5/2003 | Simon et al. | |
| 2004/0064737 A1 | 4/2004 | Milliken et al. | |
| 2004/0148520 A1 | 7/2004 | Talpade et al. | |
| 2005/0229244 A1 | 10/2005 | Khare et al. | |
| 2011/0162060 A1 | 6/2011 | Vijayakumar et al. | |
| 2013/0094537 A1 | 4/2013 | Hui et al. | |
| 2013/0223218 A1* | 8/2013 | Vasseur | H04L 45/38 370/232 |
| 2014/0222748 A1* | 8/2014 | Mermoud | H04L 41/16 706/58 |
| 2015/0249586 A1 | 9/2015 | Byers et al. | |
| 2015/0277532 A1* | 10/2015 | Mishaeli | G06F 1/3206 713/324 |
| 2015/0358777 A1 | 12/2015 | Gupta | |
| 2016/0112502 A1 | 4/2016 | Clarke et al. | |
| 2017/0286154 A1* | 10/2017 | Baptist | G06F 3/0611 |
| 2017/0302663 A1* | 10/2017 | Nainar | H04L 9/3247 |
| 2018/0146001 A1* | 5/2018 | Chien | H04L 9/3247 |
| 2018/0212992 A1 | 7/2018 | Nikolaev et al. | |
| 2018/0295016 A1 | 10/2018 | Frahim et al. | |
| 2018/0295066 A1* | 10/2018 | Pawar | H04L 47/724 |
| 2018/0343476 A1* | 11/2018 | Loheide | G06Q 30/0633 |
| 2018/0375739 A1* | 12/2018 | Derby | H04L 67/51 |
| 2019/0149629 A1 | 5/2019 | Wetterwald et al. | |
| 2019/0158370 A1 | 5/2019 | You et al. | |
| 2020/0389440 A1 | 12/2020 | Zhao et al. | |

OTHER PUBLICATIONS

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/FAN/2-0/CU-FAN-2-DIG.pdf>, 182 pages.

Deru et al., "Redundant Border Routers foe Mission-Critical 6LoWPAN Networks", [online], [retrieved on May 15, 2019]. Retrieved from the Internet: URL: <https://inl.info.ucl.ac.be/system/files/deru13redundant.pdf>, 8 pages.

Thomas et al., "Packet Delivery Deadline time in 6LoWPAN Routing Header", [online], 6lo Internet-Draft, Mar. 8, 2019, [retrieved on May 24, 2019]. Retrieved from the Internet: URL: <https://tools.ietf.org/pdf/draft-ietf-6lo-deadline-time-04.pdf>, pp. 1-18.

Minaburo et al., "LPWAN Static Context Header Compression (SCHC) and fragmentation for IPV6 and UDP", [online], Ipwan Working Group Internet-Draft, Dec. 14, 2018, [retrieved on May 28, 2019]. Retrieved from the Internet: URL: <https://tools.ietf.org/pdf/draft-ietf-lpwan-ipv6-static-context-hc-18.pdf>, pp. 1-76.

Lear et al., "Manufacturer Usage Description Specification", [online], Network Working Group Internet-Draft, Aug. 1, 2016, [retrieved on May 16, 2019]. Retrieved from the Internet: URL: <https://tools.ietf.org/pdf/draft-lear-ietf-netmod-mud-04.pdf>, pp. 1-26.

Thubert, Ed., "Routing for RPL Leaves", [online], ROLL Internet Draft, Feb. 23, 2018, [retrieved on May 15, 2019]. Retrieved from the Internet: URL: <https://tools.ietf.org/pdf/draft-thubert-roll-unaware-leaves-03.pdf>, pp. 1-13.

Zhao et al., "Adaptive Objective Function for Low-Power and Lossy Networks", [online], Cisco Systems, Inc., Jan. 12, 2018, [retrieved on Feb. 20, 2019]. Retrieved from the Internet: URL: <https://priorart.ip.com/IPCOM/000252452>, 4 pages.

SDX Central, "Mobile Edge Computing vs. Multi-Access Edge Computing", [online], [retrieved om May 28, 2019]. Retrieved from the Internet: URL: <https://www.sdxcentral.com/edge/definitions/mobile-edge-computing-vs-multi-access-edge-computing/>, pp. 1-2.

Bimschas et al., "Middleware for Smart Gateways Connecting Sensornets to the Internet", [online], MidSens '10 Proceedings of the 5th International Workshop on Middleware Tools, Services and Run-Time Support for Sensor Networks, Nov. 2010, [retrieved on May 15, 2019]. Retrieved from the Internet: URL: <http://www.iti.uni-luebeck.de/fileadmin/user_upload/Paper/MidSens2010.pdf>, 8 pages.

Cisco, "Manufacturer Usage Description", [online], [retrieved on May 23, 2019]. Retrieved from the Internet: <URL: https://developer.cisco.com/site/mud/>, pp. 1-4.

Krzyzanowski, "Internet Technology 14. Network Security", [online], Rutgers University, Apr. 20, 2016, [retrieved on Mar. 4, 2019]. Retrieved from the Internet: URL: <https://www.cs.rutgers.edu/~pxk/352/notes/content/14-security-slides.pdf>, pp. 1-67.

Wikipedia, "Presentation layer", [online], Mar. 5, 2019, [retrieved on May 21, 2019]. Retrieved from the Internet: URL: <https://en.wikipedia.org/w/index.php?title=Special:ElectronPdf&page=Presentation+layer&action=show-download-screen>, pp. 1-3.

Winter, Ed., et al., "RPL: IPV6 Routing Protocol for Low-Power and Lossy Networks", Internet Engineering Task Force (IETF), Request for Comments: 6550, Mar. 2012, pp. 1-157.

Lear et al., "Manufacturer Usage Description Specification", Internet Engineering Task Force (IETF), Request for Comments: 8520, Mar. 2019, pp. 1-60.

Van Den Abeele et al., "Secure Service Proxy: A CoAP(s) Intermediary for a Securer and Smarter Web of Things", [online], Sensors 2017, Jul. 21, 2017, [retrieved on May 15, 2019]. Retrieved from the Internet: URL: <https://www.ncbi.nlm.nih.gov/pmc/articles/PMC5539466/pdf/sensors-17-01609.pdf>, pp. 1-30.

Liu et al., "Load Balanced Routing for Low Power and Lossy Networks", TR2013-037 Apr. 2013, pp. 1-7.

* cited by examiner

FIG. 3E

ROOT NETWORK DEVICE CAUSING EXECUTION OF NETWORK SERVICE OPERATIONS ON BEHALF OF CONSTRAINED WIRELESS NETWORK DEVICE IN A LOW POWER AND LOSSY NETWORK

This application is a continuation of application Ser. No. 16/432,661, filed Jun. 5, 2019.

TECHNICAL FIELD

The present disclosure generally relates to a root network device causing execution of network service operations on behalf of a constrained wireless network device in a low power and lossy network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"). Such large-scale wireless mesh networks (also referred to as field area networks (FANs), or Low Power and Lossy Networks (LLNs)) can be used for deployment of, for example, a connected grid mesh (CG-mesh) network advanced metering infrastructure (AMI). The LLN (e.g., CG-mesh) network can include thousands of IEEE 802.15.4e/g based resource-constrained (e.g., low-power) network devices (also referred to herein as Low Power and Lossy Network (LLN) devices), where each LLN network device can reach, within its transmission range, hundreds of neighboring network devices. Hence, noise and/or interference on a wireless RF channel can affect communications between LLN network devices.

A problem associated with the deployment of the CG-mesh network that comprises thousands of LLN devices is that a source device that is outside the CG-mesh network (also referred to herein as a "head end device") sending one or more data packets to different LLN devices in the CG-mesh network can cause substantial traffic burdens in the CG-mesh: for example, if a given destination LLN device is incapable of processing a received data packet having been sent from the head end device via the CG-mesh network, the destination LLN device needs to respond to the head end device with an error message, for example an Internet Control Message Protocol (ICMP) error message. Consequently the data packet originated by the head end device can cause substantial processing burdens on the LLN network devices required to respond to the erroneous data packets, and further causes substantial processing burdens due to the traffic encountered by the propagation of the erroneous data packets and resulting error messages in the CG-mesh network.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: registering, by a root network device in a low power and lossy network, a constrained network device that is reachable within the low power and lossy network; obtaining, by the root network device, executable code associated with execution of a network service operation by the constrained network device; receiving a data packet from a source device and destined for the constrained network device; and causing execution on the data packet, by the root network device, of the network service operation on behalf of the constrained network device in response to reception of the data packet.

In another embodiment, an apparatus is implemented as a physical machine, and comprises: non-transitory machine readable media configured for storing executable machine readable code; a device interface circuit configured for receiving a registration request from a constrained network device that is reachable within a low power and lossy network; and a processor circuit. The processor circuit is configured for executing the machine readable code, and when executing the machine readable code operable for: registering, by the apparatus implemented as a root network device in the low power and lossy network, the constrained network device in response to the registration request; obtaining, by the root network device, executable code associated with execution of a network service operation by the constrained network device; receiving a data packet from a source device and destined for the constrained network device; and causing execution on the data packet, by the root network device, of the network service operation on behalf of the constrained network device in response to reception of the data packet.

In another embodiment, one or more non-transitory tangible media encoded with logic for execution by a machine and when executed by the machine operable for: registering, by the machine implemented as a root network device in a low power and lossy network, a constrained network device that is reachable within the low power and lossy network; obtaining, by the root network device, executable code associated with execution of a network service operation by the constrained network device; receiving a data packet from a source device and destined for the constrained network device; and causing execution on the data packet, by the root network device, of the network service operation on behalf of the constrained network device in response to reception of the data packet.

Detailed Description

Particular embodiments enable a root network device, in a low power and lossy network (LLN) comprising multiple constrained network devices ("LLN devices") each configured for executing network service operations as part of sending and receiving data packets in the LLN, to obtain executable code associated with execution of the network service operations by the LLN devices. The root network device, in response to receiving a data packet from a source device (e.g., outside the LLN from a head end server device via a wide area network) and destined for a destination constrained network device (also referred to as a "destination LLN device"), can cause execution of the network service on the data packet, on behalf of the destination constrained network device.

The executable code "associated with execution of a network service operation" refers to executable code that executes one or more of the network services performed by an LLN device: depending on implementation the executable code obtained by the root network device (e.g., from a manufacturer and/or authorized provider of the LLN device) can be the same, identical (i.e., "native") code as implemented in the LLN device; the executable code obtained by the root network device also can be a different form (e.g., Java as opposed to machine binary code) that enables the root network device (and/or a local computing device) to execute the same network service operations either natively within the execution environment of the root network device (and/or a local computing device), or within a virtualized environment hosted in the root network device (and/or a local computing device).

Hence, example embodiments enable the root network device to cause execution on the data packet of the network service operation on behalf of the constrained network device. The "cause execution" refers to the constrained network device either executing network service in response to internal execution of the obtained executable code, and/or the constrained network device forwarding the data packet to a locally-reachable computing device (e.g., a "fog" computing node) configured for executing the obtained executable code.

Consequently, the example embodiments can minimize the network service operations that need to be executed by the destination LLN device, for example error-check operations, decryption of received data packets or encryption of data packets destined outside the LLN, etc. Moreover, the execution of the network service operation on a received data packet on behalf of the destination LLN device minimizes transmission of unnecessary data traffic into the LLN, as the root network device can execute any error processing on a received data packet (e.g., ICMP error processing and reporting, etc.), report the error to the source device (e.g., reachable outside the LLN), and drop the "error-prone" data packet, without transmitting the error-prone data packet into the LLN for delivery to the destination LLN device.

The example embodiments also are scalable for causing execution of network service operations on behalf of thousands of LLN devices in the LLN, as the root network device can "cause" execution of the network service operation based on forwarding the received data packet to one or more locally-reachable computing devices (e.g., a rack of high-performance computing devices) configured for executing the network service operations within virtualized machines, etc., and receiving from the one or more locally-reachable computing devices responses indicating the relative success of the data packet processed by the virtualized execution of the network service operations on behalf of the LLN devices.

Figure 1:
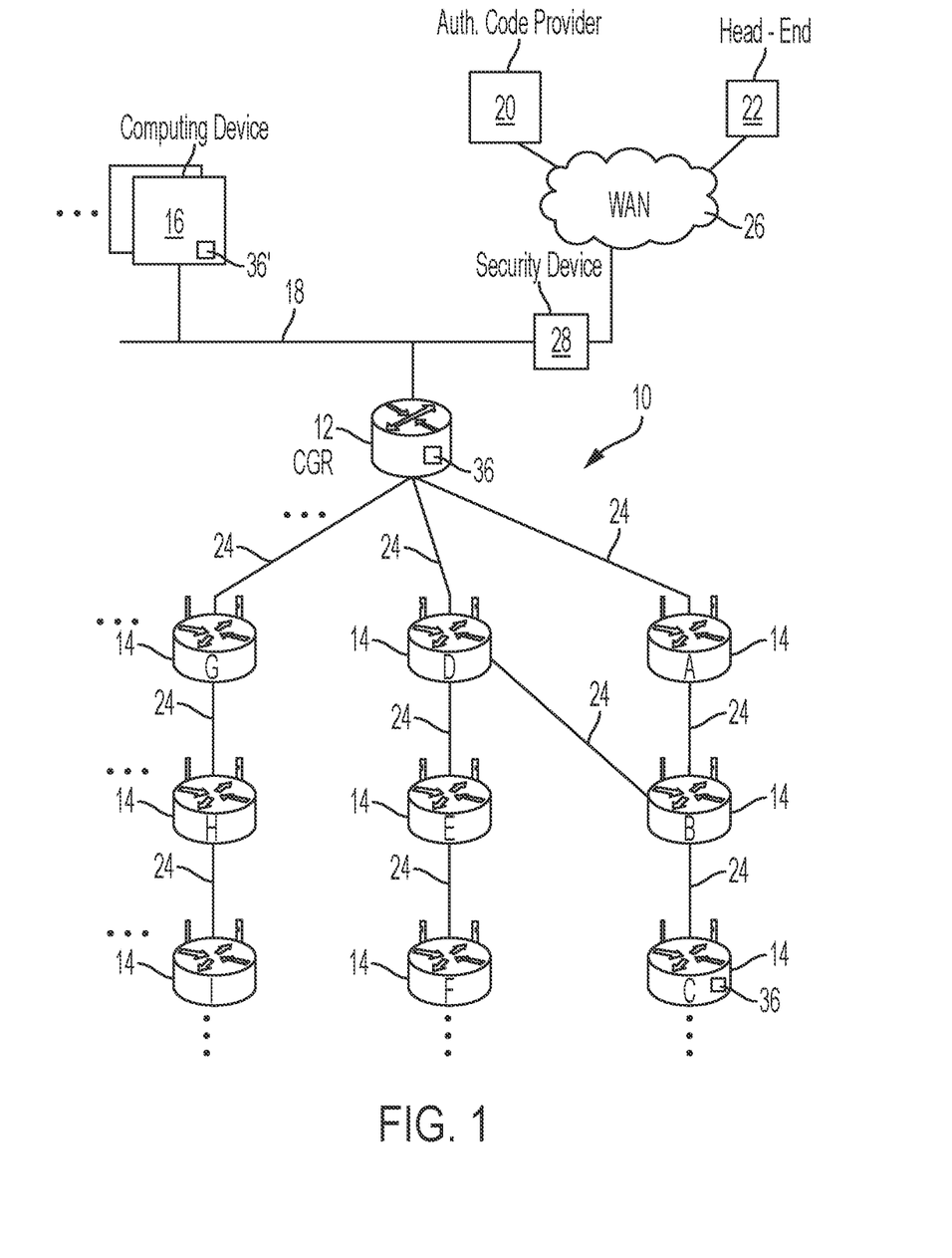
FIG. 1 illustrates an example system having an apparatus (e.g., a root network device) for causing execution, on a data packet, of a network service operation on behalf of a constrained network device in a low power and lossy network, according to an example embodiment.

FIG. 1 illustrates an example wireless mesh data network 10, for example an IEEE 802.15.4e/g based CG-mesh network having a root mesh network device 12 configured for operating as a directed acyclic graph (DAG) root for multiple wireless mesh network devices 14, according to an example embodiment. The root network device "CGR" 12 can be implemented, for example, as a commercially-available Cisco® 1000 Series Connected Grid Router (CGR) from Cisco Systems, San Jose, California, that is modified as described herein; hence, the root mesh network device 12 also is referred to as a CGR 12 or DAG root 12, or a root network device "CGR" 12.

The root network device "CGR" 12 can serve as a "sink" for the mesh network devices 14, for example the root network device "CGR" 12 enables the wireless mesh network devices 14 to reach one or more locally-reachable computing devices 16 via a backbone link 18, and/or different remote devices 20 and/or 22. As illustrated in FIG. 1, each wireless mesh network device 14 in the wireless mesh data network 10 can establish a link layer mesh topology via wireless data links 24. Each wireless mesh network device 14 can be implemented as a constrained network device, or "LLN device" or "CG-mesh" device, configured for operating for example as a RPL node according to the Internet Engineering Task Force (IETF) Request for Comments (RFC) 6550. Hence, each wireless mesh network device 14 can establish a tree-based network topology overlying the wireless mesh data network 10, described below, that is rooted at the root network device "CGR" 12.

Each computing device 16 is locally reachable by the root network device "CGR" 12 via the backbone link 18; in contrast, each remote device 20, 22 is reachable via a wide area network (WAN) (e.g., the Internet) 26 that is separated from the backbone link 18 by a "demilitarized zone" (DMZ) 28 comprising, for example, at least a router device and a security appliance (e.g., "firewall") device (the router device and security appliance device can be integrated into a single security device, hence the "DMZ" 28 also is referred to as a security device 28 for simplicity).

The Root network device "CGR" 12 can be configured for causing creation of a tree-based topology overlying the link layer mesh data network 10 based on transmitting one or more DODAG information object (DIO) messages, for example according to RFC 6550. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 24 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) toward the root network device "CGR" 12, where all routes in the LLN terminate at the root network device "CGR" 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., node "C" or beyond).

The DODAG can be formed based on a DODAG information object (DIO) advertised by the DAG root 12, where a "child" network device (e.g., "A") 14 detecting the DIO can select the DAG root 12 as a parent in the identified DODAG based on comparing network topology metrics (advertised in the DIO) to a prescribed objective function of the RPL instance. The "child" network device (e.g., "A") 14, upon attaching to its parent, can output its own DIO with updated network topology metrics that enable other wireless mesh network devices 14 to discover the DODAG, learn the updated network topology metrics, and select a DODAG parent.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "B" of FIG. 1) for an attached "child" RPL node (e.g., "C"). For example, in response to a parent network device "B" receiving a data packet originated by its child network device "C" 14, the parent network device "B" can cache a downward path (i.e., away from the DAG root 12) that the target device "C" 14 is reachable via a given egress interface on the parent device "B" (e.g., output to an IPv6 address "B::C" that is the attachment address of the target device "C"); the next parent network device "A", in response to receiving the data packet from its child RPL node "B", can cache the downward path that the target device "C" 14 is reachable via the child RPL node "B".

Hence, each of the parent network devices "A", "B", etc. 14 can execute a caching (e.g., a transient caching on a temporary basis) of a downward path (i.e., away from the DAG root 12) for reaching the target network device "C" 14, independent of any route table entry in the parent network device; moreover, a common parent device (e.g., "D") 14 can cache downward paths toward multiple "target devices" (e.g., network devices "C" and "F") within its sub-DAG, such that a data packet originated by one RPL node "C" and destined toward another RPL node "F" can be forwarded by the common parent device (e.g., "D") to the corresponding parent device "E" of the destination target "F" eliminating the necessity that the data packet be forwarded via the default route toward the DAG root 12.

Figure 2:
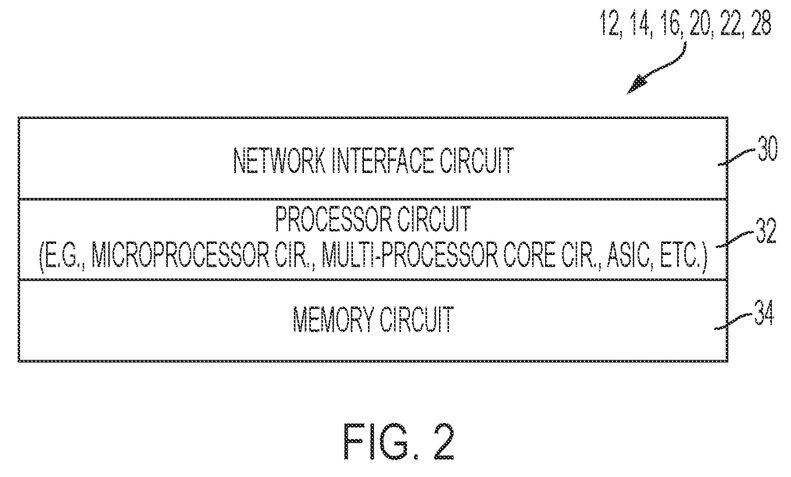
FIG. 2 illustrates an example implementation of any one of the network devices of FIG. 1, according to an example embodiment.

FIG. 2 illustrates an example implementation of any one of the devices 12, 14, 16, 20, 22, and/or 28 of FIG. 1, according to an example embodiment. Each device 12, 14, 16, 20, 22, and/or 28 is a physical machine (i.e., a hardware device) configured for communications with any other device 12, 14, 16, 20, 22, and/or 28.

Each apparatus 12, 14, 16, 20, 22, and/or 28 can include a device interface circuit 30, a processor circuit 32, and a memory circuit 34. The device interface circuit 30 can include one or more distinct physical layer transceivers for communication with any one of the other devices 12, 14, 16, 20, 22, and/or 28; the device interface circuit 30 also can include an IEEE based Ethernet transceiver for communications with the devices of FIG. 1 via any type of data link (e.g., a wired or wireless link, an optical link, etc.), for example a wireless IEEE 802.15.4e/g data link. For example, the root network device "CGR" 12 can have a wired transceiver for communications via the backbone link 18, and a wireless transceiver for communication with the wireless mesh network devices 14. Each computing device 16 and the security device can have a wired transceiver for communications via the backbone link 18, and optionally a wireless transceiver. Each wireless mesh network device 14 can include one or more wireless transceivers.

The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12, 14, 16, 20, 22, and/or 28 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 32, for example based on memory address assignment and partitioning executed by the processor circuit 32.

FIGS. 3A-3E illustrate example execution of a network service operation, by a root network device on behalf of a constrained network device in the low power and lossy network of FIG. 1, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 1, a constrained network device such as the LLN device "C" 14 can be configured (e.g., during manufacture and/or installation of a software update) to receive and store in its memory circuit 34 a location identifier from an authorized executable code provider device 20, where the authorized executable code provider device 20 can be the device manufacturer or authorized software provider for the LLN device "C" 14, etc. The location identifier (e.g., a Uniform Resource Identifier (URI)) can identify executable network service code (e.g., "SVC_C") 36 deployed within the LLN device "C" 14 (e.g., stored in its corresponding memory circuit 34 and executed by its corresponding processor circuit 32), where the executable network service code (e.g., "SVC_C") 36 is associated with execution of a network service operation by the LLN device "C" 14 as part of sending and receiving data packets in the LLN. As described below, the LLN device "C" 14 further can be configured for generating and outputting, upon initial attachment in the LLN 10 (e.g., as part of its "power-up" operations), a registration request (e.g., "R_RQ_C") specifying the URI for the executable network service code (e.g., "SVC_C") 36, SSH security keys, etc.

Figure 3A:
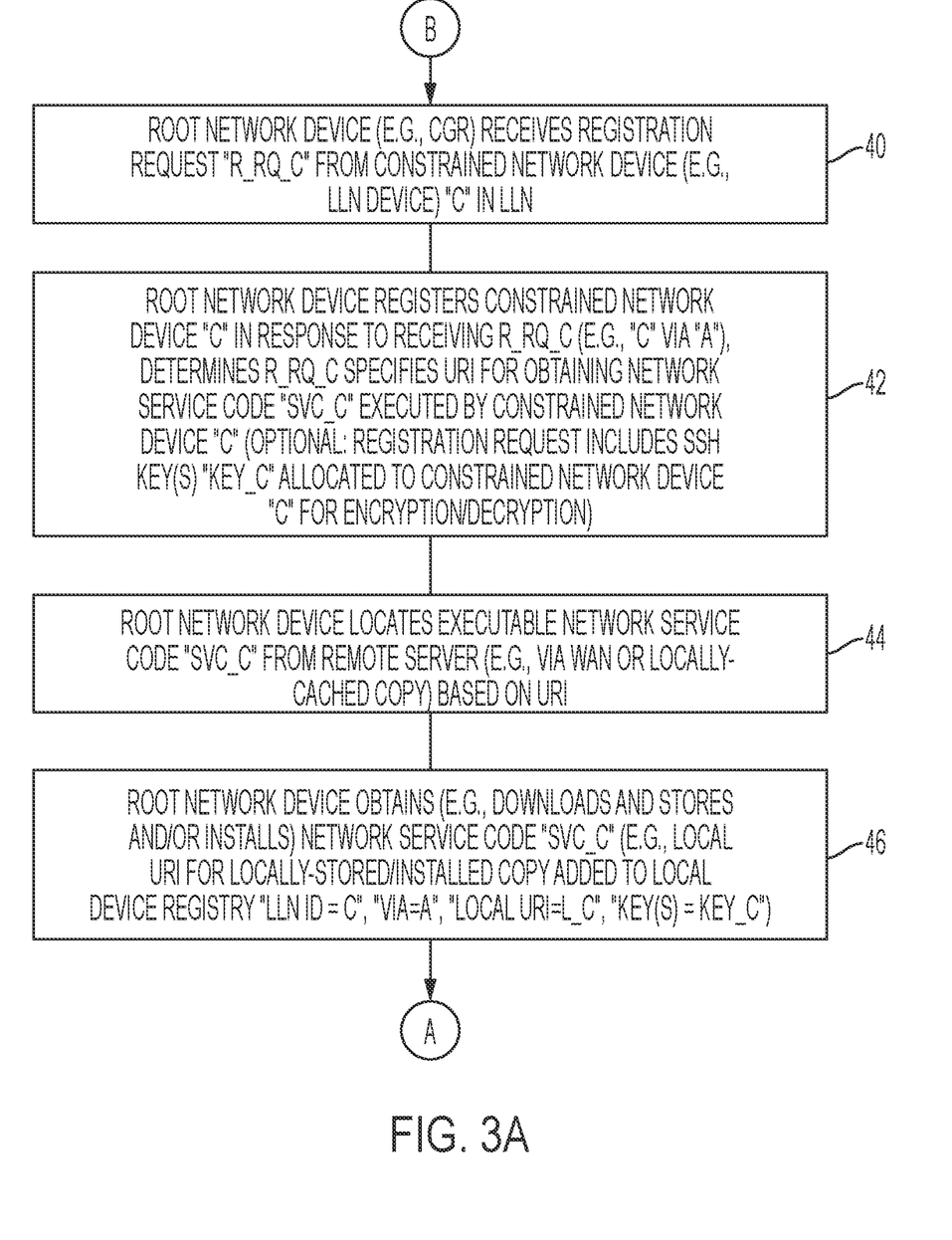
FIGS. 3A-3E illustrate example execution of a network service operation, by a root network device on behalf of a constrained network device in the low power and lossy network of FIG. 1, according to an example embodiment.

Referring to operation 40 of FIG. 3A, the device interface circuit 30 of the root network device "CGR" 12 is configured for receiving a registration request (e.g., "R_RQ_C") from a wireless mesh network device 14 in the LLN 10, for example the LLN device "C" 14 (via the attached LLN device "A" 14): the registration request (e.g., "R_RQ_C") may be specified within a DAO message originated by the LLN device "C" 14; the registration request (e.g., "R_RQ_C") also may be specified within a separate message originated by the LLN device "C" 14 that is separate and distinct from the DAO message originated by the LLN device "C" 14. As described below, the registration request (e.g., "R_RQ_C") can include parameters associated with enabling the root network device "CGR" 12 to cause execution of a network service operation on behalf of the LLN device "C" 14.

The processor circuit 32 of the root network device "CGR" 12 is configured for registering in operation 42 the LLN device "C" 14 in response to the registration request received by the device interface circuit 30 (and forwarded by the device interface circuit 30 to the processor circuit 32). In particular, the processor circuit 32 of the root network device "CGR" 12 can be configured for detecting, within the registration request received by the device interface circuit 30 of the root network device "CGR" 12, a location identifier (e.g., a Uniform Resource Identifier (URI)) that identifies the executable network service code (e.g., "SVC_C") 36 associated with execution of a network service operation by the LLN device "C" 14 as part of sending and receiving data packets in the LLN. In particular, the location identifier (e.g., URI) identifies a reachable location (e.g., accessible via the authorized executable code provider device 20) that enables the processor circuit 32 of the root network device "CGR" 12 to obtain (e.g., via the WAN 26), an executable copy of the executable network service code (e.g., "SVC_C") 36 that is normally executed by the LLN device "C" 14 as part of its network service operations for sending and receiving data packets in the LLN 10. Any one of the parameters specified in the registration request and associated with execution of the network service operation can be implemented as a Manufacturer Usage Description (MUD) based identifier, as described for example in the IETF RFC 8520, "Manufacturer Usage Description Specification".

As described in further detail below with respect to FIGS. 3B-3E, the "network service operation" as described herein refers to any one or more operations associated with successful reception of a data packet, including TCP/UDP port identification and error processing, network layer (e.g., IPv6) reachability identification and error processing, Internet Control Message Protocol (ICMP) error processing, link layer flow control, Secure Shell (SSH) processing, etc. Hence, the "network service operations" as described herein refers to operations executed at the "Presentation Layer" (i.e., layer 6 of the 7-layer Open Systems Interconnection (OSI) model) and/or below, i.e., excluding Application Layer operations at "layer 7" of the OSI model.

Hence, the processor circuit 32 of the root network device "CGR" 12 in operation 42 can respond to reception of the registration request (e.g., "R_RQ_C") by creating in its memory circuit 34 a local registration entry identifying the LLN device "C" 14 (e.g., by IPv6 address) and the corresponding location identifier (e.g., URI) for obtaining a copy of the executable network service code (e.g., "SVC_") 36.

The processor circuit 32 of the root network device "CGR" 12 in operation 42 also can detect within the registration request (e.g., "R_RQ_C") additional parameters associated with providing the network service operations on behalf of the LLN device "C" 14, for example one or more SSH security keys (e.g., "KEY_C") allocated exclusively to the LLN device "C" 14 by a trusted certificate authority (e.g., the authorized executable code provider device 20) for encryption and/or decryption of data packets; alternately, the URI can specify a corresponding location for obtaining from the authorized executable code provider device 20 both the copy of the executable network service code (e.g., "SVC_C") 36 and the SSH security keys allocated exclusively to the LLN device "C" 14; alternately the registration request (e.g., "R_RQ_C") can specify a second URI that enables the processor circuit 32 of the root network device "CGR" 12 to obtain from the authorized executable code provider device 20 (or another trusted certificate authority distinct from the authorized executable code provider device 20) the SSH security keys (e.g., "KEY_C").

The processor circuit 32 of the root network device "CGR" 12 in operation 44 is configured for locating the executable network service code (e.g., "SVC_C") 36 based on the URI, where the processor circuit 32 of the root network device "CGR" 12 can reach an authorized source of the executable network service code (e.g., "SVC_C") 36 provided by the authorized executable code provider device 20 via the WAN 26 based on the URI. The processor circuit 32 of the root network device "CGR" 12 in operation 44 also can be configured for providing any credentials required by the authorized executable code provider device 20, for example to verify that the root network device "CGR" 12 is a legitimate agent of the LLN 10 that is authorized to deploy the LLN device "C" 14.

The processor circuit 32 of the root network device "CGR" 12 in operation 46 can obtain (e.g., download and store in its memory circuit 34 and/or install, as appropriate), the executable network service code (e.g., "SVC_C") 36 (or an equivalent executable copy 36') as supplied by the authorized executable code provider device 20. As described previously, the root network device "CGR" 12 can obtain the identical copy of the executable code 36 deployed in the wireless mesh network device 14 (e.g., if implemented as Java-based code or some other non-machine binary code); the root network device "CGR" 12 also can obtain an equivalent executable copy 36', for execution in a different operating system environment or a virtualized environment, for example in the case where the original executable network service code (e.g., "SVC_C") 36 is implemented as machine binary code. As illustrated in FIG. 1, the root network device "CGR" 12 can execute an identical copy of the executable network service code (e.g., "SVC_C") 36, whereas the computing device 16 can execute the equivalent executable copy 36', for example within a virtualized environment hosted by the processor circuit 32 of the computing device 16.

The processor circuit 32 of the root network device "CGR" 12 in operation 46 can deploy the executable network service code (e.g., "SVC_C") 36 (or its equivalent executable copy 36') for localized execution based on local installation of the executable network service code (e.g., "SVC_C") 36 (or 36') for execution by the processor circuit 32; the processor circuit 32 of the root network device "CGR" 12 also can deploy the executable network service code (e.g., "SVC_C") 36 (or 36') for localized execution based on sending a copy of the executable network service code (e.g., "SVC_C") 36 (or 36') to a local computing device 16, reachable via the backbone link 18, with an instruction to install the executable network service code (e.g., "SVC_C") 36 (or 36') for virtualized on-demand execution of the network service operation on behalf of the LLN device "C" 14, as needed in response to reception of a data packet destined for the LLN device "C" 14, described below.

As described previously, the processor circuit 32 of the root network device "CGR" 12 in operation 46 also can obtain from the authorized executable code provider device 20 (or another trusted certificate authority) the SSH security keys (e.g., "KEY_C"), as appropriate, based on the URI or a second URI supplied to the root network device "CGR" 12 by the LLN device "C" 14. The processor circuit 32 of the root network device "CGR" 12 also can obtain and/or utilize a locally-cached copy of the executable network service code (e.g., "SVC_C") 36, for example if a previously-registered network device (e.g., "B") specified in its registration request a MUD-based manufacturer identifier and MUD-based device model identifier that matches a corresponding manufacturer identifier and device model identifier specified in the registration request "R_RQ_C" from the LLN device "C" 14.

Hence, the processor circuit 32 of the root network device "CGR" 12 in operation 46 can create in its memory circuit 34 a local device registry (i.e., local registration entry) for the LLN device "C" 14 identifying the LLN device "C" 14 (e.g., "LLN ID=C"), its corresponding IPv6 attachment address (e.g., "B::C"), a globally-reachable IPv6 address, reachability information (e.g., via LLN device "A"), a local URI "L_C" used to locally-access the locally-installed executable network service code (e.g., "SVC_C") 36 (or 36') in the root network device "CGR" 12 or one of the computing devices 16, the associated SSH security key (e.g., "KEY(S)=KEY_C"), etc. The processor circuit 32 can access the local device registry for the wireless mesh network device 14, for causing execution of the network service operations on behalf of the LLN device "C" 14, in response to receiving (e.g., from outside the wireless mesh data network 10) a data packet destined for the LLN device "C" 14.

Figure 3B:
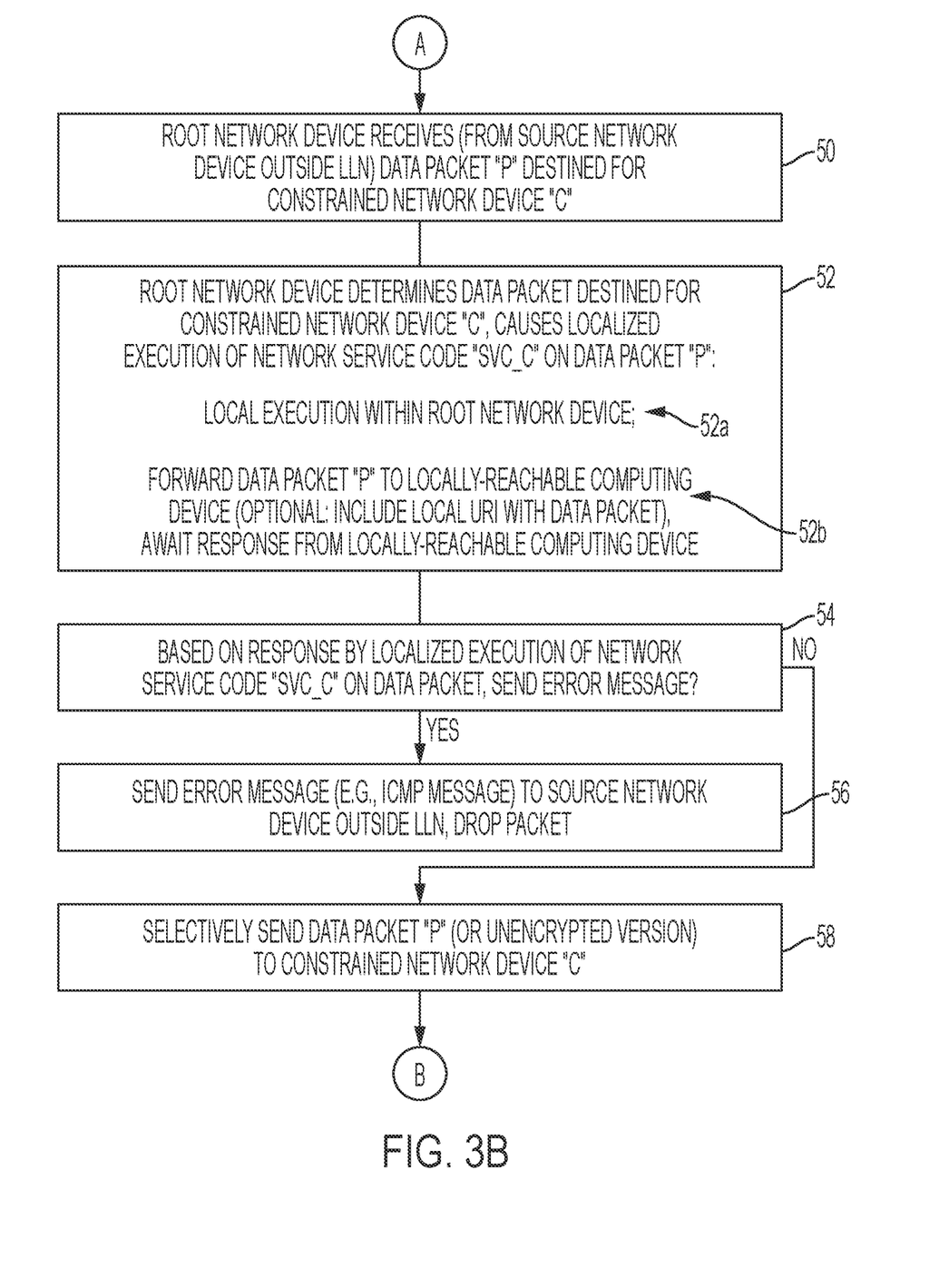

Referring to FIG. 3B, the device interface circuit 30 of the root network device "CGR" 12 in operation 50 is configured for receiving a data packet from source device: the source device can be the head-end device 22 reachable via a path outside the wireless mesh data network 10, e.g., via the WAN 26 and the security device 28; the source device can also be another executable resource hosted on one of the computing devices 16; in another embodiment, the source device can be another wireless mesh network device 14

(e.g., LLN device "H" 14): the device interface circuit 30 can respond to reception of the data packet by forwarding the data packet to the processor circuit 32 for processing.

The processor circuit 32 of the root network device "CGR" 12 in operation 52 can respond to reception of the data packet by determining that the data packet is destined for the LLN device "C" 14, and in response the processor circuit 32 of the root network device "CGR" 12 can access the local registry for the LLN device "C" 14 (implemented, for example as a routing table in the memory circuit 34 for reachability in the wireless mesh data network 10): the processor circuit 32 of the root network device "CGR" 12 in operation 52 can determine from the local registry entry for the LLN device "C" 14 the corresponding local URI "L_C" that identifies the executable network service code (e.g., "SVC_C") 36 to be locally executed (or its equivalent executable copy 36') based on accessing the local device registry for the LLN device "C" 14. The processor circuit 32 of the root network device "CGR" 12 in operation 52 can cause localized execution of the executable network service code (e.g., "SVC_C") 36 (or its equivalent executable copy 36') on the received data packet, based on the corresponding local URI "L_C", either locally within the root network device "CGR" 12 in operation 52a, or based on forwarding in operation 52b the data packet (and optionally the local URI "L_C") to a locally-reachable computing device 16 via the backbone link 18.

As described previously, each computing device 16 can be configured for executing the executable network service code (e.g., "SVC_C") 36 (and/or the equivalent executable copy 36', as appropriate) on the received data packet on behalf of the LLN device "C" 14: also note that a load balancer resource may be deployed as a "front end" to the computing devices 16 for directing the data packet to an appropriate computing device 16 for execution of the network service operation on behalf of the LLN device "C" 14; hence, the computing device 16 executing the executable network service code (e.g., "SVC_C") 36 (or its equivalent executable copy 36') for execution of the network service operation on behalf of the LLN device "C" 14 can generate a response, described below, and forward the response back to the root network device "CGR" 12 via the backbone link 18.

The processor circuit 32 of the root network device "CGR" 12 in operation 54 can determine whether the response of executing the network service operation (based on localized execution of the executable network service code (e.g., "SVC_C") 36 or 36' in the root network device "CGR" 12 or computing device 16) indicates a relative success or failure of the data packet by the network service operation, for example indicating whether the received data packet complies with all constraints, filtering rules, etc. that are enforced by the network service operation. As described in further detail below, one example failure is that the received data packet specifies a User Datagram Protocol (UDP) that is not used by the LLN device "C" 14 (e.g., "UDP=1000").

If in operation 54 the processor circuit 32 of the root network device "CGR" 12 detects a relative failure of the data packet to comply with one or more constraints associated with the LLN device "C" 14 (e.g., UDP value "1000" in data packet does not match UDP ports "23" or "90" available in the LLN device "C" 14), the processor circuit 32 of the root network device "CGR" 12 in operation 56 can send to the source network device (e.g., the head-end device 22 via the security device 28 and the WAN 26) an error message (e.g., an ICMP error processing message), for example an ICMP "error unreachable" message in response to detecting that the UDP value "1000" is not valid for the LLN device "C" 14.

If, however, the processor circuit 32 of the root network device "CGR" 12 determines in operation 54 that the localized execution of the network service operation on behalf of the LLN device "C" 14 (based on localized execution of the executable network service code (e.g., "SVC_C") 36 or 36') indicates the received data packet complies with all the network service operations, the processor circuit 32 of the root network device "CGR" 12 in operation 58 can selectively send the data packet (or an unencrypted version, described below) to the LLN device "C" 14 via the first-hop child LLN device "A" 14 (or via the alternate parent LLN device "D" 14, as appropriate).

Hence, the example embodiments enable localized execution of network service operations on behalf of a specific LLN device 14 (e.g., LLN device "C" 14), reducing unnecessary traffic in the wireless mesh data network 10 and minimizing unnecessary error processing (or decryption/encryption operations) by the LLN device "C" 14.

Figure 3C:
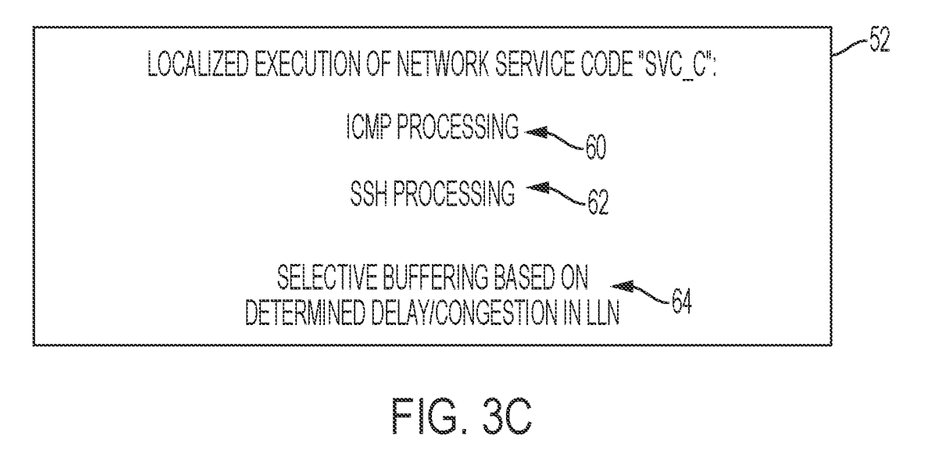

FIG. 3C illustrates example localized network service operations 52 that can be executed by the root network device "CGR" 12 and/or a locally-available computing device 16 on behalf of a wireless mesh network device 14 (e.g., the LLN device "C" 14), according to an example embodiment. One example network service operation can include ICMP based processing 60, where the root network device "CGR" 12 and/or a computing device 16 determines whether a received data packet complies with all network-based constraints set in the target LLN device "C" 14, for example whether the correct TCP/UDP port numbers are specified, whether the received data packet exceeds a prescribed packet size limit, whether the data packet exceeds a prescribed traffic constraint such as maximum rate exceeded (e.g., too many packets per unit of time for a destination), or unfeasible latency (e.g., packets requiring a time constraint such as a time-bounded deterministic packet or lined time information as specified in the IETF Draft, "Packet Delivery Deadline time in 6LoWPAN Routing Header" (draft-ietf-610-deadline-time-04)). Other operations can include "black-listing" an untrusted source and notifying an administrator of the wireless mesh data network 10. Hence, any network service operations (i.e., at the OSI Presentation layer or below) can be executed by the root network device "CGR" 12 on behalf of a wireless mesh network device 14.

Figure 3D:
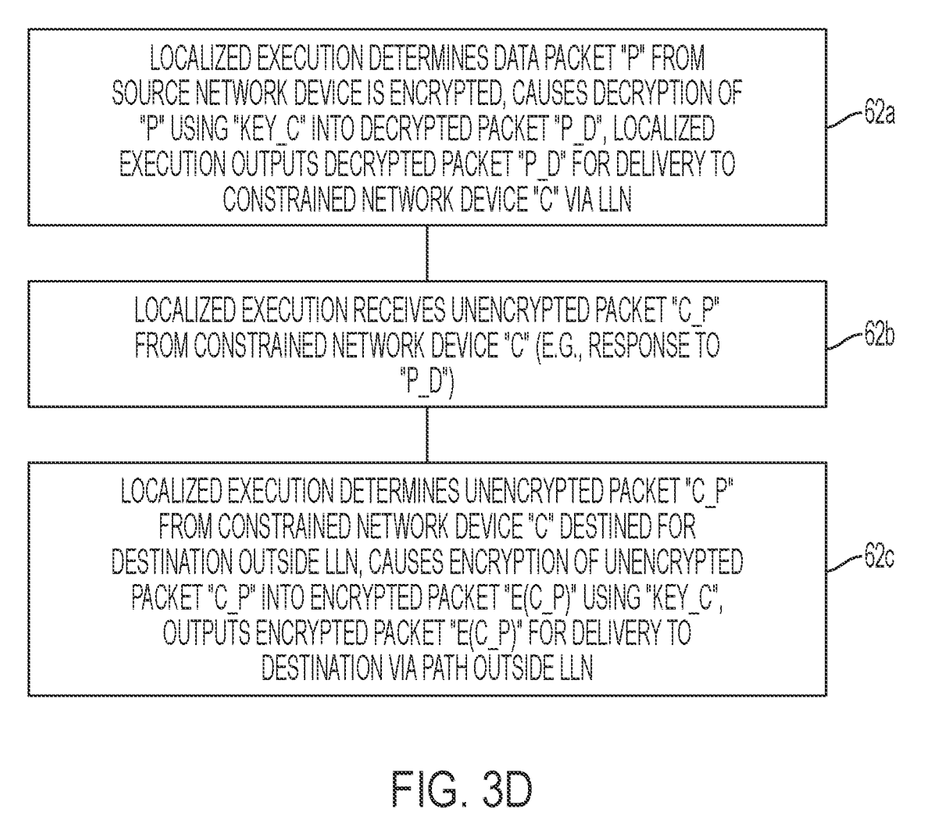

Other localized network service operations 52 can include SSH processing 62, where the processor circuit 32 of the root network device "CGR" 12 (or a computing device 16) can execute decryption and/or encryption operations on behalf of a wireless mesh network device 14 (e.g., the LLN device "C" 14). Referring to FIG. 3D, the processor circuit 32 of the root network device "CGR" 12 (or a computing device 16) in operation 62a can determine the data packet received in operation 50 from the source head-end device 22 and destined for the LLN device "C" 14 is encrypted: in response the processor circuit 32 of the root network device "CGR" 12 can cause localized decryption (either in the root network device "CGR" 12 or by a local computing device 16) of the encrypted data packet into a decrypted packet "P_D" based on the corresponding key "KEY_C" obtained for the LLN device "C" 14. The decrypted packet "P_D" can be output by the localized instance of the network service operation (e.g., the processor circuit 32 in the root network device "CGR" 12 or the computing device 16) for transmission into the wireless mesh data network 10 via the next-hop child LLN device "A" 14 for delivery of the decrypted packet "P_D" to the LLN device "C" 14.

The localized instance of the network service operation (e.g., the processor circuit 32 in the root network device "CGR" 12 or the computing device 16) in operation 62b also can receive in operation 62b an unencrypted packet "C_P" originated by the LLN device "C" 14 and destined for a destination outside the wireless mesh data network 10 (e.g., a response to the encrypted packet "P" originated by the head-end device 22). The localized instance of the network service operation (e.g., the processor circuit 32 in the root network device "CGR" 12 or the computing device 16) in operation 62c can determine the unencrypted packet "C_P" is destined outside the wireless mesh data network 10, and in response cause encryption of the unencrypted packet "C_P" into an encrypted packet "E(C_P)" using the corresponding key "KEY_C" obtained for the LLN device "C" 14. The localized instance of the network service operation (e.g., the processor circuit 32 in the root network device "CGR" 12 or the computing device 16) in operation 62c can cause the encrypted packet "E(C_P)" to be output for delivery to the specified destination, for example the head-end device 22 via the security device 28 and the WAN 26.

Figure 3E:
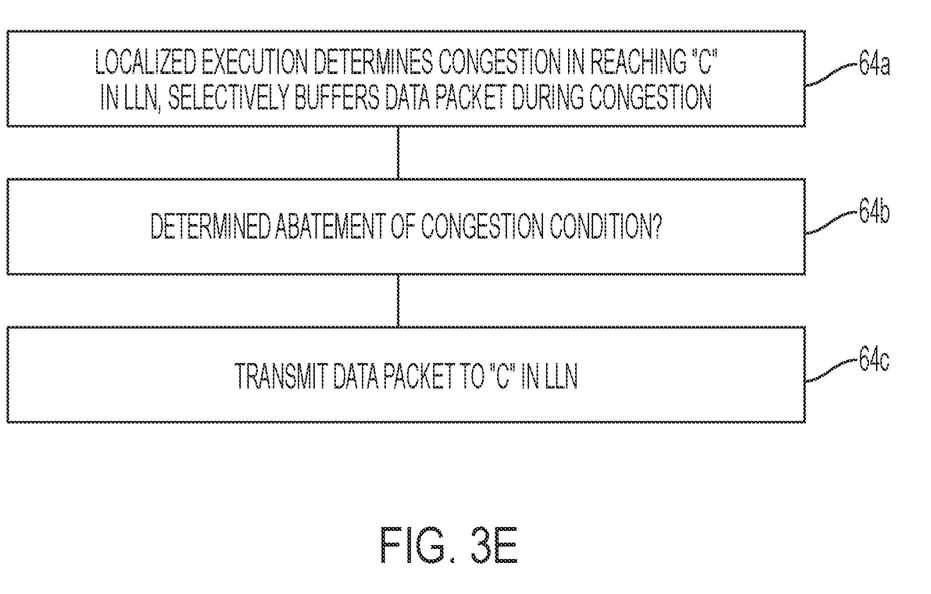

FIGS. 3C and 3E illustrate another example localized execution 64 of the network service operation (e.g., the processor circuit 32 in the root network device "CGR" 12 or the computing device 16), based on a determined congestion in the LLN device "C" 14, and/or a determined congestion in the path for reaching the LLN device "C" 14 in the wireless mesh data network 10 (e.g., via network devices "A" and "B"). For example, the localized instance of the network service operation (e.g., the processor circuit 32 in the root network device "CGR" 12 or the computing device 16) in operation 64a can determine any one of the network devices "A", "B", and/or "C" are encountering congestion in the wireless mesh data network 10, for example due to monitoring traffic in the wireless mesh data network 10 (e.g., a traffic burst from the LLN device "H" 14 destined for LLN device "B" 14). The localized instance of the network service operation (e.g., the processor circuit 32 in the root network device "CGR" 12 or the computing device 16) in operation 64a can selectively buffer the data packet in response to detection of the congestion condition, until a determined abatement of the congestion condition in reaching the destination LLN device "C" 14. In response to determining in operation 64b the abatement of the congestion condition in reaching the destination LLN device "C" 14, the localized instance of the network service operation (e.g., the processor circuit 32 in the root network device "CGR" 12 or the computing device 16) in operation 64c can cause transmission of the data packet to the destination LLN device "C" 14 via the first-hop child LLN device "A" 14 (or alternate LLN device "D", as appropriate).

According to example embodiments, a root network device in a low power and lossy network can act as a "proxy" by causing execution of a network service operation on a received data packet, on behalf of a constrained network device in the low power and lossy network and destined to receive the data packet, based on causing execution of executable code associated with execution of the network service operation. The root network device not only can reduce processing requirements in the constrained network device by executing the network service operation on a received data packet on behalf of a constrained network device, but the root network device also can minimize unnecessary traffic by responding with error messages, as appropriate, without the necessity of injecting the erroneous data packet into the low power and lossy network. Hence, the example embodiments can prevent the unnecessary transmission of an erroneous data packet to a destination LLN device in the LLN, and can further prevent the destination LLN device from being required to process the erroneous data packet and generate its own error message (e.g., an ICMP message) that would need to be transmitted via the LLN back to the root network device for transmission to the source of the erroneous data packet.

Although the foregoing examples illustrate the root network device "CGR" 12 causing execution of network service operations on behalf of an LLN device in the LLN in response to receiving a data packet from outside the LLN, the example embodiments also can be applied to the root network device "CGR" 12 causing execution of the network service operations on behalf of the LLN device in response to receiving the data packet from another LLN device in the LLN network. Additional network service operations that can be executed in the root network device on behalf of the LLN device can include protocol translation and compression, in order to minimize the various protocol translation and compression executable programs that need to be deployed in the LLN device: examples of such protocol translation and compression that can be executed in the root network device, on behalf of the LLN device, can include the operations as described in the Internet Draft by Minaburo et al., "LPWAN Static Context Header Compression (SCHC) and fragmentation for IPv6 and UDP" (draft-ietf-lpwan-ipv6-static-context-he-18).

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    registering, by a root network device in a network, a network device that is reachable within the network;
    obtaining, by the root network device, executable code associated with execution of a network service operation for the network device;
    receiving a data packet from a source device and destined for the network device; and
    causing, by the root network device, execution of the network service operation on the data packet on behalf of the network device based on the executable code.

2. The method of claim 1, wherein:
    registering includes receiving, by the root network device from the network device, a security key allocated exclusively to the network device;
    causing includes:
    determining the data packet is encrypted,
    causing decryption of the data packet into a decrypted packet, and
    sending the decrypted packet to the network device via the network.

3. The method of claim 2, wherein causing further includes:
    receiving an unencrypted message from the network device in response to the decrypted packet;
    causing encryption of the unencrypted message into an encrypted message based on the security key; and
    sending the encrypted message to a second network device.

4. The method of claim 1, wherein causing includes:
forwarding the data packet to a locally-reachable computing device configured for executing the executable code associated with the network service operation on behalf of the network device;
receiving a response generated by the locally-reachable computing device having executed the network service operation; and
forwarding the response, by the root network device, to one of either the network device in the network or a second network device.

5. The method of claim 1, wherein the network service operation includes any one or more of Internet Control Message Protocol (ICMP) error processing on the data packet, Secure Shell (SSH) processing on the data packet, or selective buffering of the data packet based on a determined delay in reaching the network device in the network.

6. The method of claim 1, wherein causing includes:
determining a congestion condition associated with reaching the network device in the network;
selectively buffering the data packet until a determined abatement of the congestion condition; and
transmitting, into the network, the data packet for delivery to the network device, based on the determined abatement of the congestion condition.

7. An apparatus implemented as a physical machine, the apparatus comprising:
non-transitory machine readable media configured for storing executable machine readable code;
a device interface circuit configured for receiving a registration request from a network device that is reachable within a network; and
a processor circuit configured for executing the machine readable code, and when executing the machine readable code operable for:
registering, by the apparatus implemented as a root network device in the network, the network device in response to the registration request,
obtaining, by the root network device, executable code associated with execution of a network service operation for the network device,
receiving a data packet from a source device and destined for the network device, and
causing, by the root network device, execution of the network service operation on the data packet on behalf of the network device on the data packet based on the executable code.

8. The apparatus of claim 7, wherein:
the processor circuit is configured for receiving, from the network device, a security key allocated exclusively to the network device;
the processor circuit further configured for causing execution based on:
determining the data packet is encrypted,
causing decryption of the data packet into a decrypted packet, and
causing the device interface circuit to send the decrypted packet to the network device via the network.

9. The apparatus of claim 8, wherein the processor circuit further is configured for:
receiving an unencrypted message from the network device in response to the decrypted packet;
causing encryption of the unencrypted message into an encrypted message based on the security key; and
sending the encrypted message to a second network device.

10. The apparatus of claim 7, wherein the processor circuit is configured for causing execution based on:
forwarding the data packet to a locally-reachable computing device configured for executing the executable code associated with the network service operation on behalf of the network device;
receiving a response generated by the locally-reachable computing device having executed the network service operation; and
forwarding the response, by the root network device, to one of either the network device in the network or a second network device.

11. The apparatus of claim 7, wherein the network service operation includes any one or more of Internet Control Message Protocol (ICMP) error processing on the data packet, Secure Shell (SSH) processing on the data packet, or selective buffering of the data packet based on a determined delay in reaching the network device in the network.

12. The apparatus of claim 7, wherein the processor circuit is configured for causing execution based on:
determining a congestion condition associated with reaching the network device in the network;
selectively buffering the data packet until a determined abatement of the congestion condition; and
transmitting, into the network, the data packet for delivery to the network device, based on the determined abatement of the congestion condition.

13. One or more non-transitory tangible media encoded with logic for execution by a machine and when executed by the machine operable for:
registering, by the machine implemented as a root network device in a network, a network device that is reachable within the network;
obtaining, by the root network device, executable code associated with execution of a network service operation for the network device;
receiving a data packet from a source device and destined for the network device; and
causing, by the root network device, execution of the network service operation on the data packet on behalf of the network device on the data packet based on the executable code.

14. The one or more non-transitory tangible media of claim 13, wherein:
registering receiving, by the root network device from the network device, a security key allocated exclusively to the network device;
causing includes:
determining the data packet is encrypted,
causing decryption of the data packet into a decrypted packet, and
sending the decrypted packet to the network device via the network.

15. The one or more non-transitory tangible media of claim 14, wherein causing further includes:
receiving an unencrypted message from the network device in response to the decrypted packet;
causing encryption of the unencrypted message into an encrypted message based on the security key; and
sending the encrypted message to a second network device.

16. The one or more non-transitory tangible media of claim 13, wherein causing includes:
forwarding the data packet to a locally-reachable computing device configured for executing the executable code associated with the network service operation on behalf of the network device;

receiving a response generated by the locally-reachable computing device having executed the network service operation; and forwarding the response, by the root network device, to one of either the network device in the network or a second network device.

17. The one or more non-transitory tangible media of claim 13, wherein the network service operation includes any one or more of Internet Control Message Protocol (ICMP) error processing on the data packet, Secure Shell (SSH) processing on the data packet, or selective buffering of the data packet based on a determined delay in reaching the network device in the network.

18. The one or more non-transitory tangible media of claim 13, wherein causing includes:

determining a congestion condition associated with reaching the network device in the network;

selectively buffering the data packet until a determined abatement of the congestion condition; and transmitting, into the network, the data packet for delivery to the network device, based on the determined abatement of the congestion condition.

\* \* \* \* \*

UNITED STATES PATENT AND TRADEMARK OFFICE
CERTIFICATE OF CORRECTION

PATENT NO. : 12,185,092 B2  
APPLICATION NO. : 17/563646  
DATED : December 31, 2024  
INVENTOR(S) : Li Zhao et al.

Page 1 of 1

It is certified that error appears in the above-identified patent and that said Letters Patent is hereby corrected as shown below:

In the Specification

Column 9, Line 18 please amend as shown:  
of the executable network service code (e.g., "SVC_C") 36.

Column 12, Line 42 please amend as shown:  
6lo-deadline-time-04)). Other operations can include Signed and Sealed this  
First Day of April, 2025

Coke Morgan Stewart  
*Acting Director of the United States Patent and Trademark Office*